United States Patent
Tsuji et al.

(10) Patent No.: US 8,769,965 B2
(45) Date of Patent: Jul. 8, 2014

(54) MAGNETIC REFRIGERATING MATERIAL AND MAGNETIC REFRIGERATING DEVICE

(75) Inventors: Hideyuki Tsuji, Yokohama (JP); Akiko Saito, Kawasaki (JP); Tadahiko Kobayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1400 days.

(21) Appl. No.: 12/015,812

(22) Filed: Jan. 17, 2008

(65) Prior Publication Data

US 2008/0216484 A1    Sep. 11, 2008

(30) Foreign Application Priority Data

Mar. 8, 2007   (JP) ................. 2007-057964

(51) Int. Cl.
F25B 21/00 (2006.01)
C01F 17/00 (2006.01)
C04B 35/40 (2006.01)
C04B 35/64 (2006.01)
H01F 1/00 (2006.01)

(52) U.S. Cl.
USPC .......................... 62/3.1; 423/263; 252/62.57

(58) Field of Classification Search
USPC ............. 62/3.1; 423/263; 252/62.57, 62.51 R
See application file for complete search history.

(56) References Cited

U.S. PATENT DOCUMENTS

| | | | |
|---|---|---|---|
| 3,125,861 A * | 3/1964 | Jaep ................................. | 62/3.7 |
| 5,743,095 A * | 4/1998 | Gschneidner et al. ........... | 62/3.1 |
| 6,581,387 B1 * | 6/2003 | Ullom .............................. | 62/3.1 |
| 6,676,772 B2 | 1/2004 | Saito et al. | |
| 6,877,325 B1 * | 4/2005 | Lawless ........................... | 62/3.1 |
| 7,063,754 B2 | 6/2006 | Fukamichi et al. | |
| 7,168,255 B2 | 1/2007 | Saito et al. | |
| 2003/0221750 A1 * | 12/2003 | Pecharsky et al. ............ | 148/121 |
| 2006/0213580 A1 | 9/2006 | Tsuji et al. | |
| 2006/0218936 A1 * | 10/2006 | Kobayashi et al. .............. | 62/3.1 |
| 2006/0240991 A1 * | 10/2006 | Takahashi et al. ............ | 505/300 |
| 2006/0254385 A1 | 11/2006 | Tsuji et al. | |
| 2007/0220901 A1 | 9/2007 | Kobayashi et al. | |

FOREIGN PATENT DOCUMENTS

| | | | | |
|---|---|---|---|---|
| JP | 03039451 A | * | 2/1991 | ............. C22C 38/00 |
| JP | 2003-96547 | | 4/2003 | |

OTHER PUBLICATIONS

Fukamichi et al., Magnetic Refrigeration Material and Producing Method thereof, Apr. 3, 2003., PAJ, JP 2003-096547, all.*
U.S. Appl. No. 11/858,450, filed Sep. 20, 2007, Akiko Saito, et al.

* cited by examiner

Primary Examiner — Allen Flanigan
Assistant Examiner — Filip Zec
(74) Attorney, Agent, or Firm — Oblon, Spivak, McClelland, Maier & Neustadt, L.L.P.

(57) ABSTRACT

A magnetic refrigeration material includes: at least one selected from the group consisting of Y, La, Ce, Pr, Nd, Sm, Eu, Gd, Tb, Dy, Ho, Er, Tm and Tb by a range of 4 to 15 atomic percentages; at least one selected from the group consisting of Fe, Co, Ni, Mn and Cr by a range of 60 to 93 atomic percentages; at least one selected from the group consisting of Si, C, Ge, Al, Ga and In by a range of 2.9 to 23.5 atomic percentages; and at least one selected from the group consisting of Ta, Nb and W by a range of 1.5 atomic percentages or less, wherein the magnetic refrigeration material includes a $NaZn_{13}$ type crystal structure as a main phase.

20 Claims, 2 Drawing Sheets

MAGNETIC REFRIGERATING MATERIAL AND MAGNETIC REFRIGERATING DEVICE

CROSS-REFERENCE TO RELATED APPLICATIONS

This application is based upon and claims the benefit of priority from the prior Japanese Patent Application Ser. No. 2007-057964, filed on Mar. 8, 2007; the entire contents of which are incorporated herein by reference.

BACKGROUND OF THE INVENTION

1. Field of the Invention

The present invention relates to a magnetic refrigerating material and a magnetic refrigerating device.

2. Description of the Related Art

A magnetic refrigeration technique raises expectations for refrigeration technology in view of environmental enhancement because the magnetic refrigeration technique can exhibit the high refrigeration efficiency under low energy consumption and clean environment. In this point of view, such a device as utilizing magnetic refrigeration technique within an ordinary temperature range and such a material as exhibiting a large magnetic entropy change within or in the vicinity of the ordinary temperature range are developed. An AMR (Active Magnetic Regeneration Refrigeration) method is proposed as one of promising refrigerating methods. Then, a $LaFe_{13}$-based magnetic material such as $La(Fe, Si)_{13}$ is proposed as one of promising refrigeration material because the $LaFe_{13}$-based magnetic material can exhibit the larger magnetic entropy change, contains elemental Fe not expensive and is unlikely to cause a temperature hysteresis within the magnetic phase transition. Herein, no temperature hysteresis with the magnetic phase transition means that the magnetic condition of the material is not changed by the temperature change hysteresis.

In a magnetic refrigerating device using such a magnetic refrigeration material as described above, the intended refrigerating operation is carried out by using the magnetocaloric effect of the magnetic refrigeration material. In the case of the use of a ferromagnetic refrigeration material, for example, the intended refrigerating operation is carried out using the entropy change of the refrigeration material when the electromagnetic state is shifted from the paramagnetic state to the ferromagnetic state by the application of an external magnetic field under the condition that the refrigeration material is heated within or in the vicinity of the ferromagnetic phase transition temperature (Curie temperature; Tc).

Among the $LaFe_{13}$-based magnetic material, it is known that $La(Fe, Si)_{13}$ with $NaZn_{13}$ type crystal structure can exhibit a relatively large magnetic entropy change. In the $La(Fe, Si)_{13}$, the elemental Fe is mainly positioned at the Zn sites and the elemental La and the like are mainly positioned at the Na sites.

In order to apply the $LaFe_{13}$-based magnetic material to the magnetic refrigeration using the AMR method, it is required that the $LaFe_{13}$-based magnetic material is processed in small pieces such as particles in view of practical use. For example, the $LaFe_{13}$-based magnetic material is crashed and processed in small pieces after thermal treatment. In this case, however, some cracks may occur in the small pieces due to the stress at the crashing so that the small pieces may become brittle. Therefore, when the brittle small pieces of the $LaFe_{13}$-based magnetic material are charged into the heat exchanger of a magnetic refrigerating device so as to conduct the magnetic refrigeration through the thermal exchange between the small pieces and a coolant, the brittle small pieces may be vibrated in response to the flow of the coolant and the frequency of the application of a magnetic field for causing the thermal exchange.

If the brittle small pieces of the $LaFe_{13}$-based magnetic material are vibrated for a long period of time, the small pieces are crashed and frictioned with one another, resulting in containing some cracks and being worn. In this case, the thus obtained micro particles may increase the pressure loss of the coolant and decrease the refrigeration performance.

[Reference 1] JP-A 2003-96547 (KOKAI)

BRIEF SUMMARY OF THE INVENTION

It is an object of the present invention, in view of the above-described problems, to provide a magnetic refrigeration material with high magnetic refrigeration effect and large mechanical strength and a magnetic refrigerating device using the magnetic refrigeration material.

In order to achieve the above object, an aspect of the present invention relates to a magnetic refrigeration material, including: at least one selected from the group consisting of Y, La, Ce, Pr, Nd, Sm, Eu, Gd, Tb, Dy, Ho, Er, Tm and Tb by a range of 4 to 15 atomic percentages; at least one selected from the group consisting of Fe, Co, Ni, Mn and Cr by a range of 60 to 93 atomic percentages; at least one selected from the group consisting of Si, C, Ge, Al, Ga and In by a range of 2.9 to 23.5 atomic percentages; and at least one selected from the group consisting of Ta, Nb and W by a range of 1.5 atomic percentages or less, wherein the magnetic refrigeration material includes a $NaZn_{13}$ type crystal structure as a main phase.

The inventors paid an attention to a $La(Fe, Si)_{13}$ magnetic material which can exhibit a large magnetic entropy change, and intensely studies to develop the mechanical strength of the magnetic material with the maintaining the large magnetic entropy change. As a result, the inventors found out that if at least one selected from the group consisting of Ta, Nb and W is contained in the magnetic material, the mechanical strength of the magnetic material can be developed remarkably without the reduction of the magnetic entropy change.

Therefore, the magnetic material according to the aspect of the present invention can exhibit the inherent large magnetic refrigeration effect originated from the magnetic entropy change. In the case that the magnetic material is granulated and thus, charged in a heat exchanger so that the thus obtained magnetic particles are crashed and worn one another due to the flow of a coolant in the thermal exchange and the vibration originated from the application and removal of the magnetic field, the magnetic particles contains no crack and does not be worn. As a result, no micro particle is generated so as not to deteriorate the refrigeration performance of the magnetic refrigeration device due to the pressure loss of the coolant.

As a result, in the magnetic refrigeration device such as an AMR type magnetic refrigeration device which is configured such that a coolant is flowed in a heat exchanger with a magnetic material (magnetic particles) charged therein and the intended magnetic refrigeration is conducted, the magnetic refrigeration material can be preferably employed as the magnetic particles to be charged into the heat exchanger.

Another aspect of the present invention is directed at a magnetic refrigeration device characterized in that the magnetic refrigeration material as described above is charged in the heat exchanger so that the intended magnetic refrigeration can be conducted by the application and removal of the magnetic field. Concretely, the magnetic refrigeration device includes a heat exchanger in which the magnetic refrigeration material is charged; and a magnetic generator for applying a magnetic field to the magnetic refrigeration material charged in the heat exchanger and removing the magnetic field from the magnetic refrigeration material. With the magnetic refrigeration device, the intended magnetic refrigeration can be conduced much effectively and efficiently for a long-term period utilizing the large magnetic entropy change and the large mechanical strength while the destruction of the magnetic material due to the vibration of the heat exchanger is prevented.

According to the aspect of the present invention can be provided a magnetic refrigeration material with high magnetic refrigeration effect and large mechanical strength and a magnetic refrigerating device using the magnetic refrigeration material.

DETAILED DESCRIPTION OF THE INVENTION

Figure 1:
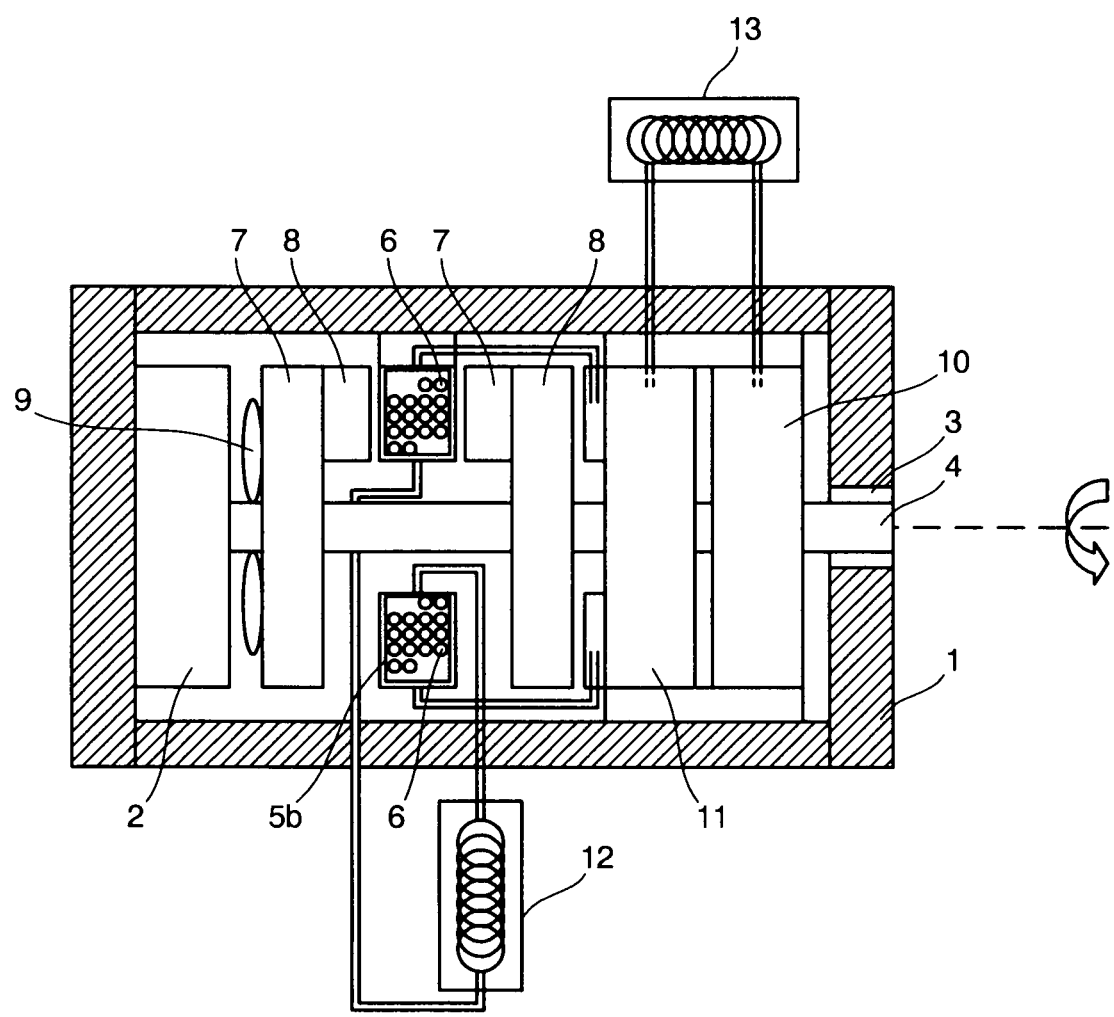
FIG. 1 is a longitudinal sectional view illustrating a magnetic refrigeration device according to an embodiment.

Hereinafter, the present invention will be described in detail with reference to the drawings.
(Magnetic Refrigeration Material)

In this embodiment, the magnetic refrigeration material contains at least one selected from the group consisting of Y, La, Ce, Pr, Nd, Sm, Eu, Gd, Tb, Dy, Ho, Er, Tm and Tb, that is, rare earth elements by a range of 4 to 15 atomic percentages. If the content of the rare earth element(s) is less than 4 atomic percentages or more than 15 atomic percentages, the generation efficiency in the magnetic refrigeration material of $NaZn_{13}$ type crystal structure phase which can exhibit excellent magnetocaloric effect is decreased so that the magnetic refrigeration material can not exhibit the magnetocaloric effect. Therefore, the magnetic refrigeration material can not be used for the magnetic refrigeration.

The selection of the rare earth elements is conducted so that a large entropy change due to the magnetic phase transition can be generated in the magnetic refrigeration material. Normally, if the elemental La is mainly contained in the magnetic refrigeration material, the intended large magnetic entropy change ($\Delta S$) can be generated in the magnetic refrigeration material. With the selection of the elemental La as a main component in the magnetic refrigeration material, another rare earth element(s) is (are) contained in the magnetic refrigeration material by minute ratio (e.g., one atomic percentage or less for the total elemental components of the magnetic refrigeration material) so as to control the magnetic phase transition temperature and the peak width of the magnetic entropy change ($\Delta S$).

In this embodiment, the magnetic refrigeration material contains at least one selected from the group consisting of Fe, Co, Ni, Mn and Cr, that is, transition metal elements by a range of 60 to 93 atomic percentages. If the content of the transition metal element(s) is less than 60 atomic percentages or more than 93 atomic percentages, the generation efficiency in the magnetic refrigeration material of $NaZn_{13}$ type crystal structure phase is decreased so that the magnetic refrigeration material can not exhibit the magnetocaloric effect. In view of the generation efficiency in the magnetic refrigeration material of $NaZn_{13}$ type crystal structure phase, it is desired that the content of elemental Fe is set within a range of 80 to 90 wt %.

Moreover, it is desired that the magnetic refrigeration material contains elemental Co by a range of 0.5 to 15 atomic percentages though the magnetic refrigeration material mainly contains the elemental Fe as described above. If the content of the elemental Co is less than 0.5 atomic percentages or more than 15 atomic percentages, the Curie temperature of the magnetic refrigeration material may be decreased or be increased so as not to exhibit a prescribed magnetocaloric effect within a practical temperature range and thus, not to conduct the intended magnetic refrigeration.

Another transition metal element such as Ni, Mn, Cr does not contribute directly to the magnetocaloric effect, but to controlling the magnetic phase transition temperature and developing the resistance to corrosion. It is desired that the transition metal element except Fe and Co is contained by minute ratio so as to realize the large magnetic entropy change ($\Delta S$). Concretely, it is desired that the content of the elemental Co and the transition metal element except Co and Fe is set to 10 atomic percentages or less for the total elemental components of the magnetic refrigeration material.

In this embodiment, the magnetic refrigeration material contains at least one selected from the group consisting of Si, C, Ge, Al, Ga and In, that is, III or IV group element(s) by a range of 2.9 to 23.5 atomic percentages. If the content of the III or IV group element(s) is less than 2.9 atomic percentages or more than 23.5 atomic percentages, the generation efficiency of the $NaZn_{13}$ type crystal structure is decreased. Herein, the III or IV group element(s) is (are) positioned at the Fe site of the $NaZn_{13}$ type crystal structure.

It is desired that the magnetic refrigeration material contains elemental Si largely from among the III or IV group elements, but in view of the control in the peak width of the entropy change and the magnetic phase transition temperature and melting point of the magnetic refrigeration material, the magnetic refrigeration material contains B, Ge, Al, Ga and/or In. The content of the III or IV group element(s) expect the elemental Si is preferably set to two atomic percentages or less for the total elemental components of the magnetic refrigeration material.

In this embodiment, the magnetic refrigeration material contains at least one selected from the group consisting of Ta, Nb and W by a range of 1.5 atomic percentages or less. In this case, the mechanical strength of the magnetic refrigeration material can be extremely enhanced while the magnetic entropy change of the magnetic refrigeration material is not decreased. If the content of the element such as Ta, Nb and W is less than 0.1 atomic percentage in the magnetic refrigeration material, the mechanical strength of the magnetic refrigeration material may be not large enough to prevent the generation of crack in the long-term use of the magnetic refrigeration material. If the content of the element such as Ta, Nb and W is more than 1.5 atomic percentages in the magnetic refrigeration material, the generation efficiency of the $NaZn_{13}$ crystal structure is decreased so that the magnetic entropy change may be decreased. More preferably, the content of the element such as Ta, Nb and W is set within a range of 0.1 to 1.0 atomic percentage.

The rare-earth element(s), the transition metal element(s) and the III or IV group element(s) are required to mainly generate the $NaZn_{13}$ type crystal structure so as to generate the large magnetic entropy change. The element(s) such as Ta, Nb and W is (are) required to develop the mechanical strength of the magnetic refrigeration material through the dispersion at the crystal boundary of the $NaZn_{13}$ type crystal structure, and not required to generate the $NaZn_{13}$ type crystal structure.

On the other hand, if the content of the element(s) such as Ta, Nb and W is increased beyond a predetermined content, the generation of the $NaZn_{13}$ type crystal structure may be disturbed so as to generate (a) by-product(s). In order to mitigate such a problem, therefore, the upper limited content of the element(s) such as Ta, Nb and W is preferably set to 1.0 atomic percentage.

In a preferred embodiment, the magnetic refrigeration material contains elemental La within a range of 5 to 10 atomic percentages, elemental Fe within a range of 70 to 91 atomic percentages and elemental Si within a range of 4 to 20 atomic percentages. Then, the magnetic refrigeration material also contains at least one selected from the group consisting of Ta, Nb and W within a range of 1.5 atomic percentages or less. In this case, the content of the element(s) such as La to constitute the $NaZn_{13}$ type crystal structure is balanced with the content of the element(s) such as Ta to contribute the mechanical strength so as to form the intended magnetic refrigeration material with large mechanical strength.

In this embodiment, since the magnetic refrigeration material does not almost exhibit the temperature hysteresis due to the magnetocaloric effect, the operation of the magnetic refrigeration device can be conducted stably even though the magnetic refrigeration material is utilized in the magnetic refrigeration device under the condition of thermal exchange. Since the magnetic refrigeration material is mainly composed of the elemental Fe as described above, the production cost of the magnetic refrigeration material can be reduced in comparison with a conventional magnetic refrigeration material so that the magnetic refrigeration material in this embodiment is widely available.

In order that the magnetic refrigeration material can exhibit the high refrigeration performance when the magnetic refrigeration material is employed in a magnetic refrigeration device (magnetic refrigeration material is charged into the heat exchanger), it is important to conduct the thermal exchange between the magnetic refrigeration material and the coolant sufficiently. In this point of view, it is desired to enlarge the specific surface area of the magnetic refrigeration material. In order to enlarge the specific surface area of the magnetic refrigeration material, it is effective to granulate the magnetic refrigeration material so that the size of each particle of the magnetic refrigeration material can be set small. Too small size of each particle may increase the pressure loss of the coolant. Moreover, the size of each particle is determined on the performance and pressure loss of a pump to be used, the size of the heat exchanger and the like. Therefore, the size (longer diameter) of each particle is preferably set within a range of 0.1 to 2 mm, more preferably within a range of 0.4 to 1.5 mm.

Preferably, the particulate magnetic refrigeration material is formed in spherical shape or oval shape. In this case, no micro particle is generated originated from the destruction of the particulate magnetic refrigeration material and the pressure loss of the coolant can be reduced so as to maintain the high thermal exchange efficiency. Concretely, the magnetic refrigeration material is preferably processed such that the 80 weight percentages or more of the magnetic refrigeration material can have an aspect ratio of two or less. The aspect ratio definition is originated from that in the mixing of the spherical particles with the non-spherical particles of an aspect ratio of two or more, some micro particles are generated from the mixture of the spherical particles and the non-spherical particles through the long-term exposure of the mixture when the content of the non-spherical particles in the mixture is set to 20 atomic percentages or more. In this case, the pressure loss of the coolant is increased five times as large as a normal pressure loss of the coolant.

In view of long-term reliability, a coating may be formed in a thickness of 10 μm or less on the magnetic refrigeration material. The coating is made of a material with sufficient heat conductivity, mechanical strength and corrosion resistance. Concretely, the coating is formed as an Au plated film, a Cr plated film, a permalloy plated film, an Al deposited film and/or an Au deposited film. Alternately, the coating may be made of resin so as to reduce the cost of the coating and develop the corrosion resistance.

(Manufacture of Magnetic Refrigeration Material)

In this embodiment, the magnetic refrigeration material, as described above, can be manufactured by means of a conventional manufacturing method. For example, a conventional alloy manufacturing method using casting process or arc melting process is combined with a conventional thermal treating method so as to manufacture the magnetic refrigeration material. Moreover, if a conventional alloy manufacturing method using roll quenching process or atomizing process which can exhibit rapid cooling is employed, the thermal treatment period can be reduced remarkably and the magnetic refrigeration material can be easily processed in ribbony shape or spherical shape.

For example, the magnetic refrigeration material can be manufactured as follows:

(i) First of all, the constituent components as raw materials of the magnetic refrigeration material are blended and controlled in atomic percentage ratio, and then, melted to be uniformized. The sort and amount of the constituent component is determined on the composition (content of each component) of the magnetic refrigeration material. Concretely, the rare-earth element particles or powders of 4 to 15 atomic percentages, the transition metal element particles or powders of 60 to 93 atomic percentages, the III or IV group element particles or powders of 2.9 to 23.5 atomic percentages and the Ta, Nb and/or W element particles or powders of 1.5 atomic percentages or less are blended and arc-melted to form an ingot through solidification.

In this case, the rare-earth element particles or powders mainly contains the elemental La, but may contain another rare-earth element such as elemental Y in view of the large magnetic entropy change due to the magnetocaloric effect as described above. The transition metal element particles or powders mainly contains the elemental Fe, but may contain another transition metal element such as elemental Co in view of the Curie temperature and the magnetocaloric effect around the practical temperature rage of the magnetic refrigeration material as described above. The III or IV group element particles or powders and the Ta, Nb and/or W element particles or powders may be prepared in the same manner as the transition metal element particles or powders and the like.

Then, (ii) the $NaZn_{13}$ type crystal structure is generated. the $NaZn_{13}$ type crystal structure can be uniformly generated through the thermal treatment within a temperature range of 900° C. to 1250° C. for one week to two weeks.

Then, (iii) in the use of the magnetic refrigeration material in the magnetic refrigeration device, the magnetic refrigeration material can be granulated as follows: Namely, the melted liquid drops are floated from the ingot with the $NaZn_{13}$ type crystal structure in a chamber under non-active gas atmosphere. In this case, the liquid drops are shaped in sphere by the inherent surface tension thereof and then, cooled down to be solidified. As a result, the intended particles with an average particle diameter of 0.1 to 2 mm of the magnetic refrigeration material can be manufactured.

(Magnetic Refrigeration Device)

Then, the magnetic refrigeration device using the magnetic refrigeration material as described in the embodiment will be described. FIG. 1 is a longitudinal sectional view illustrating a magnetic refrigerating device in this embodiment. As illustrated in FIG. 1, the magnetic refrigeration device is housed in a cylindrical case 1. A motor 2 as a rotary drive is attached to one inner end of the case 1. As the motor 2, an electric motor and an oil hydraulic motor can be exemplified. Then, a rotary shaft 4 is rotatably provided with bridging from the motor 2 to a bearing 3 provided at the center of the other inner end of the case 1.

Then, heat exchangers 5a, 5b are provided at the center of the case 1 along the inner side surface of the case 1. The magnetic refrigeration material 6 as described in the embodiment is charged into the heat exchangers 5a, 5b.

Then, a pair of magnetic yokes 7 are attached to the rotary shaft 4 so as to sandwich the heat exchangers 5a, 5b. Then, a pair of permanent magnets 8 as a magnetic field generating means are attached to the magnetic yokes 7 so as to sandwich the heat exchangers 5a, 5b. The permanent magnets 8 are rotated with the rotary shaft 4 so that a magnetic field is applied to or removed from the magnetic refrigeration material 6 charged into the heat exchangers 5a, 5b. The magnetic yokes 7 constitute the return path of a magnetic flux generated from the permanent magnets 8 so as to enhance the efficiency of the magnetic circuit. In this embodiment, the pair of permanent magnets 8 are attached to the magnetic yokes 7, respectively, but one permanent magnet may be attached to one magnetic yoke so as to be opposite to the other magnetic yoke.

A fan 9 for forced cooling operation is attached to the rotary shaft 4 so as to cool down the interior of the case 1.

Then, a coolant pump 10 of watertight construction is provided in the case 1. The coolant pump 10 includes a fan (not shown) attached to the rotary shaft 4 so that the coolant can be circulated by the rotation of the fan. When the fan is not rotated, the coolant pump 10 serves as a coolant tank.

The coolant pump 10 may be provided outside of the case 1. In this case, however, since another drive is required to circulate the coolant of the coolant pump 10, it is desired to provide the coolant pump 10 in the case 1 as shown in FIG. 1.

Then, a rotary coolant controlling valve 11 is provided in the case 1 such that a rotor (not shown), attached to the rotary shaft 4, is provided in the valve 11. The rotor is slid along the inner surface of the valve 11. The coolant can be charged in and discharged from the coolant pump 10 in accordance with the rotation of the rotor.

Then, a cooling unit 12 and a heat exhaust unit 13 are provided outside the case 1. Then, a tube is connected with the coolant pump 10 so as to introduce the coolant from the heat exhaust unit 13 into the coolant pump 10. Then, another tube is connected with the coolant pump 10 so as to discharge the coolant from the coolant pump 10 into the rotary coolant controlling valve 11. Then, a tube is connected with the rotary coolant controlling valve 11 so as to introduce the coolant from the coolant pump 10 into the valve 11. Then, another tube is connected with the rotary coolant controlling valve 11 so as to discharge the coolant from the vale 11 into the heat exhaust unit 13. Then, the other tube is connected with the rotary coolant controlling valve 11 so as to discharge the coolant from the valve 11 into the heat exchangers 5a, 5b as heat absorbing stages. The length of one side of the rotor in the rotary coolant controlling valve 11 is set larger than the distance between the inlet and the outlet in the side of the cooling unit and the distance between the inlet and the outlet in the side of the heat exhaust unit.

The coolant is circulated in the coolant path which is configured so as to connect in turn the coolant pump 10, the rotary coolant controlling valve 11, the heat exchangers 5a, 5b at absorbing stage, the cooling unit 12, the heat exchangers 5a, 5b at not-absorbing stage, the rotary coolant controlling valve 11, the heat exhaust unit 13 and the coolant pump 10. The cooing unit 12 may be disposed in a heat insulating space so as to generate a refrigeration space. In the cooling unit 12, since the coolant is thermally exchanged with an external atmosphere, the temperature of the coolant is increased. In the heat exhaust unit 13, since the coolant is thermally exchanged with an external atmosphere generated by a radiator plate or a forced cooling fan, the temperature of the coolant is decreased.

If the charging ratio of the magnetic refrigeration material 6 in the heat exchangers 5a, 5b is too low, the magnetic refrigeration material is vibrated by the flow of the coolant at the thermal exchange between the magnetic refrigeration material and the coolant so as to cause the crash and friction of the magnetic refrigeration material. In this case, the magnetic refrigeration material may be cracked and worn so as to generate micro particles. The micro particles result in increasing the pressure loss of the coolant and decreasing the refrigeration performance of the coolant. In order to avoid these disadvantages, therefore, the volume charging ratio of the magnetic refrigeration material in the heat exchanger is preferably set within a range of 40 to 80%. If the volume charging ratio is set less than 40%, the thermal exchange efficiency is decreased remarkably. If the volume charging ratio is more than 80%, the pressure loss of the coolant is increased. More preferably, the volume charging ratio of the magnetic refrigeration material is set within a range of 50 to 70%.

The coolant can be appropriately selected from a fluorine-based coolant, a mineral oil, an organic solvent, an ethylene glycol-based coolant, a water and a mixture thereof in accordance with the operational temperature range of cooling cycle. In view of safety, cost and high specific heat, the water is most appropriate as the coolant. Under the circumstance of the temperature range of 0° C. or below, an oil-based coolant such as mineral oil and silicone and/or an organic solvent-based coolant such as ethylene glycol and alcohol is employed. Another water solubility coolant can be employed if the water solubility coolant is mixed with the water. In this case, the mixing ratio between the coolant and the water is appropriately controlled. The size (diameter) of the magnetic refrigeration material is preferably controlled in accordance with the viscosity (surface tension) of the coolant to be employed and the size of the heat exchanger, e.g., within the desired range as described above.

(Magnetic Refrigeration Method)

Then, the magnetic refrigeration method using the magnetic refrigeration device illustrated in FIG. 1 will be described. First of all, the permanent magnets 8 are disposed so as to sandwich the heat exchangers 5a, 5b by adjusting the rotary angles of the permanent magnets 8 through the rotation of the rotary shaft 4. In this case, a magnetic field is applied to the magnetic refrigeration material 6 in the heat exchangers 5a, 5b so that the magnetic refrigeration material 6 generates a heat. Then, the coolant is discharged into the heat exhaust unit 13.

Then, the permanent magnets 8 are shifted so as not to sandwich the heat exchangers 5a, 5b by adjusting the rotary angles of the permanent magnets 8 through the rotation of the rotary shaft 4. In this case, a magnetic field is removed from the magnetic refrigeration material 6 in the heat exchangers 5a, 5b. In this case, since the coolant is cooled down by the heat absorption of the magnetic refrigeration material 6, the coolant is not discharged into the heat exhaust unit 13.

Then, the permanent magnets 8 are also rotated through the rotation of the rotary shaft 4 so that the coolant is discharged into the cooling unit 12 so as to conduct the intended refrigeration operation.

The coolant can be cooled down through the thermal exchange with the magnetic refrigeration material by repeating the application and removal of the magnetic field for the magnetic refrigeration material. In this embodiment, the application and removal of the magnetic field for the magnetic refrigeration material 6 is conducted by the rotation of the permanent magnets 8, but may be conducted by any mechanism only if the application and removal of the magnetic field for the magnetic refrigeration material 6 can be conducted.

For example, another heat exchanger with the magnetic refrigeration material and the coolant to be discharged into the heat exchanger therein is provided in the permanent magnets and then, moved vertically or laterally and repeatedly. In this case, the magnetic refrigeration can be conducted.

In the magnetic refrigeration device as described above, since the main components to be required in magnetic refrigeration are housed in the case, the size of the total refrigeration system can be downsized. Therefore, the magnetic refrigeration device can be applied to a household refrigerator, a household air conditioner, an industrial freezer, a large-sized cold storage warehouse, a liquefied gas storage/transport freezer, a plant using cooling/heat generating operation and the like. The refrigeration performance and the controlling temperature range of the magnetic refrigeration device depend on the concrete configuration in the use environmental. Moreover, the refrigeration performance can be adjusted by controlling the amount of the magnetic refrigeration material. In addition, the controlling temperature range can be adjusted by appropriately selecting the magnetic refrigeration material.

EXAMPLES 1 to 13 and COMPARATIVE EXAMPLES 1 to 4

The constituent components were controlled in atomic percentage according to the manufacturing method as described above, and then, the samples of magnetic refrigeration material were manufactured. The compositions of the samples are listed in Table 1. In Table 1, the content ratio of Ta, Nb or W in each sample is also listed. The samples were examined in crystal structure by means of X-ray diffraction and in mechanical strength.

With the examination of the mechanical strength, each sample was cut into cube pieces, and disposed on an iron plate. In this case, the length of one side of the cube piece was set to one centimeter. Then, an iron bar with a weight of 500 g was dropped onto the cube piece and then, the drop height of the iron bar was measured when some cracks occur at the cube piece. Then, the destruction energy was calculated by the following equation (1):

$$\text{Destruction energy (Nm)} = 0.5(\text{kg}) \times 9.8(\text{m/s}^2) \times \text{drop height of iron bar } (m) \quad (1).$$

Therefore, the mechanical strength was defined as the destruction energy.

In Comparative Examples 1 and 2, the sample contains no elemental Ta, Nb and W. In Comparative Examples 3 and 4, the sample contains elemental Ta, Nb or W excessively.

TABLE 1

| | | Content ratio of Ta, Nb or W | Height of iron bar when sample is broken | Brokage energy |
|---|---|---|---|---|
| Example 1 | La(Fe87Si12.5Ta0.5)13 | 0.46 | 7 | 0.343 |
| Example 2 | La(Fe87Si12Ta1)13 | 0.93 | 11.5 | 0.5635 |
| Example 3 | La(Fe87Si12.5Nb0.5)13 | 0.46 | 8 | 0.392 |
| Example 4 | La(Fe87Si12Nb1)13 | 0.93 | 13 | 0.637 |
| Example 5 | La(Fe87Si12.5W0.5)13 | 0.46 | 8.5 | 0.4165 |
| Example 6 | La(Fe87Si12W1)13 | 0.93 | 12.5 | 0.6125 |
| Example 7 | La(Fe82Co6Si11.5Ta0.5)13 | 0.46 | 8 | 0.392 |
| Example 8 | La(Fe82Co6Si11Ta1)13 | 0.93 | 12.5 | 0.6125 |
| Example 9 | La(Fe82Co6Si11.5Nb0.5)13 | 0.46 | 7.5 | 0.3675 |
| Example 10 | La(Fe82Co6Si11Nb1)13 | 0.93 | 11.5 | 0.5635 |
| Example 11 | La(Fe82Co6Si11.5W0.5)13 | 0.46 | 7 | 0.343 |
| Example 12 | La(Fe82Co6Si11W1)13 | 0.93 | 11 | 0.539 |
| Example 13 | La(Fe87Si11.5Ta1.5)13 | 1.39 | 17.5 | 0.8575 |
| Comparative Examle 1 | La(Fe87Si13)13 | 0 | 3 | 0.147 |
| Comparative Examle 2 | La(Fe82Co6Si12)13 | 0 | 2.5 | 0.1225 |
| Comparative Examle 3 | La(Fe87Si11Nb2)13 | 1.86 | 21.5 | 1.0535 |
| Comparative Examle 4 | La(Fe87Si11Nb2.5)13 | 2.32 | 23 | 1.127 |

As is apparent from Table 1, the destruction energies of the samples made of $LaFe_{13}$-based magnetic material tend to be increased by containing small amount of elemental Ta, Nb or W. Similarly, the destruction energies of the samples made of $LaFe_{13}$-based magnetic material containing element Co tend to be increased by containing elemental Ta, Nb or W. Moreover, the destruction energy of the sample is increased in proportion to the content of the elemental Ta, Nb or W.

Then, the generation efficiency of $NaZn_{13}$ type crystal structure in Examples 1~13 and Comparative Examples 1~4 were examined and listed in Table 2. In the X-ray diffraction, since the X-ray diffraction patterns relating to the $NaZn_{13}$ type crystal structure phase and the α-Fe phase were observed, the generation efficiency of the $NaZn_{13}$ type crystal structure was calculated by the following equation (2):

Generation efficiency of $NaZn_{13}$ type crystal structure (%)=[main peak intensity of the $NaZn_{13}$ type crystal structure phase]/[main peak intensity of the $NaZn_{13}$ type crystal structure phase+main peak intensity of the α-Fe phase]×100 (2)

Since the magnetic entropy change is increased as the generation efficiency of the $NaZn_{13}$ type crystal structure is increased, the sample with high generation efficiency of the $NaZn_{13}$ type crystal structure is preferable as the magnetic refrigeration material. As shown in Examples 1 to 13, it is apparent that the generation efficiency of the $NaZn_{13}$ type crystal structure in the samples becomes high because the content of the elemental Ta, Nb or W in the samples are set to 1.5 atomic percentages or less. Particularly, if the content of the elemental Ta, Nb or W is set within a range of 0.1 to 1.0 atomic percentage, the generation efficiency of the $NaZnl_3$ type crystal structure becomes 80% or more. When the content of the elemental Ta, Nb or W is set to 1.5 atomic percentages or more, the generation efficiency of the $NaZnl_3$ type crystal structure becomes extremely small and the generation efficiency of the α-Fe phase becomes large.

TABLE 2

| | | Content ratio of Ta, Nb or W | Generation ratio of NaZn13 type crystal structyre |
|---|---|---|---|
| Example 1 | La(Fe87Si12.5Ta0.5)13 | 0.46 | 88 |
| Example 2 | La(Fe87Si12Ta1)13 | 0.93 | 82 |
| Example 3 | La(Fe87Si12.5Nb0.5)13 | 0.46 | 91 |
| Example 4 | La(Fe87Si12Nb1)13 | 0.93 | 86 |
| Example 5 | La(Fe87Si12.5W0.5)13 | 0.46 | 86 |
| Example 6 | La(Fe87Si12W1)13 | 0.93 | 79 |
| Example 7 | La(Fe82Co6Si11.5Ta0.5)13 | 0.46 | 89 |
| Example 8 | La(Fe82Co6Si11Ta1)13 | 0.93 | 84 |
| Example 9 | La(Fe82Co6Si11.5Nb0.5)13 | 0.46 | 92 |
| Example 10 | La(Fe82Co6Si11Nb1)13 | 0.93 | 86 |
| Example 11 | La(Fe82Co6Si11.5W0.5)13 | 0.46 | 85 |
| Example 12 | La(Fe82Co6Si11W1)13 | 0.93 | 81 |
| Example 13 | La(Fe87Si11.5Ta1.5)13 | 1.39 | 70 |
| Comparative Examle 1 | La(Fe87Si13)13 | 0 | 92 |
| Comparative Examle 2 | La(Fe82Co6Si12)13 | 0 | 93 |
| Comparative Examle 3 | La(Fe87Si11Nb2)13 | 1.86 | 38 |
| Comparative Examle 4 | La(Fe87Si11Nb2.5)13 | 2.32 | 17 |

Figure 2:
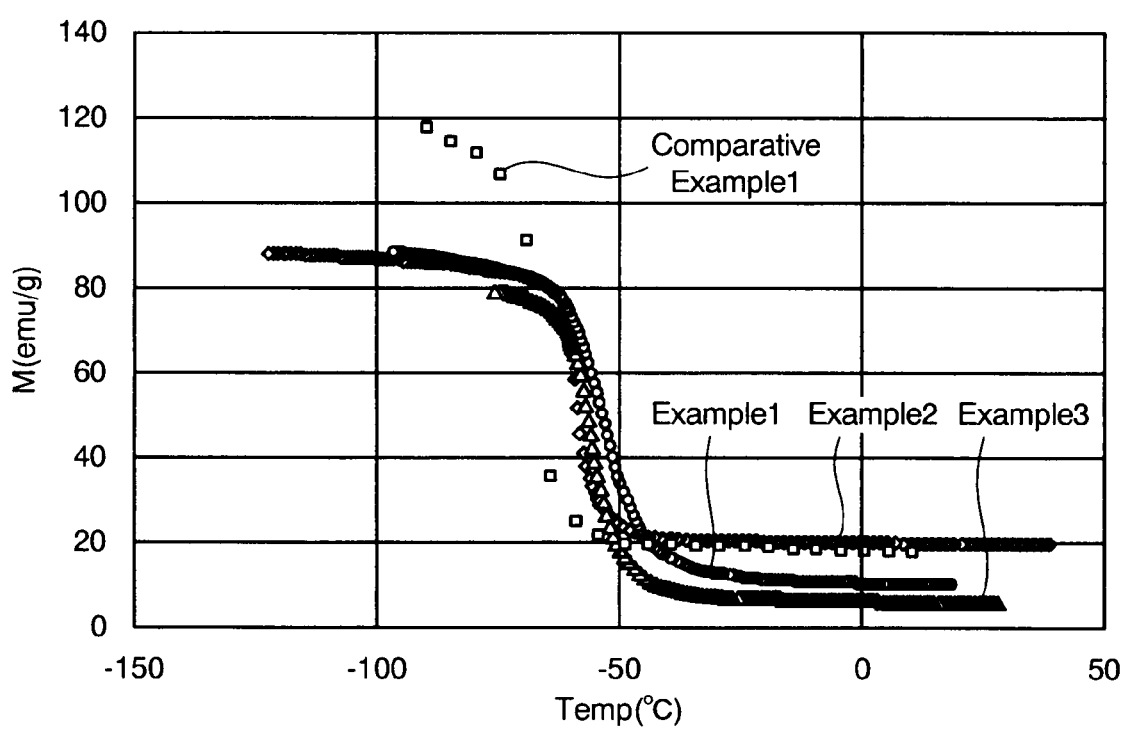
FIG. 2 is a graph showing thermomagnetic curves of samples in Examples.

FIG. 2 shows the thermomagnetic curves of the samples in Examples 1 to 3 and Comparative Example 1. The intensity of the magnetic field to be applied was set to 100 gauss. The samples in Examples 1 to 3 were shaped bulky and the sample in Comparative Example 2 was shaped acicular. As is apparent from FIG. 2, the thermomagnetic curves are similar to one another so that the samples in Examples 1 to 3 and Comparative Example 1 have almost the same Curie temperature as one another. Namely, if the $LaFe_{13}$-based magnetic material contains 1.5 atomic percentage or less of the elemental Ta, Nb or W, the magnetic property of the $LaFe_{13}$-based magnetic material is not deteriorated. Herein, since the shape of the samples in Examples 1 to 3 is different from the shape of the sample in Comparative Example 1, the absolute magnetization of the samples in Examples 1 to 3 is different from the absolute magnetization of the sample in Comparative Example 1 due to the demagnetizing field effect.

As a result, it was turned out that if the $LaFe_{13}$-based magnetic material contains 1.5 atomic percentage or less of the elemental Ta, Nb or W, the mechanical strength of the magnetic material can be developed while the magnetic property of the magnetic material is not deteriorated. In addition, it was also turned out that the content of the elemental Ta, Nb or W is preferably set within a range of 0.1 to 1.0 atomic percentage.

Although the present invention was described in detail with reference to the above examples, this invention is not limited to the above disclosure and every kind of variation and modification may be made without departing from the scope of the present invention.

What is claimed is:

1. A magnetic refrigeration material, comprising:
    at least one selected from the group consisting of Y, La, Ce, Pr, Nd, Sm, Eu, Gd, Tb, Dy, Ho, Er, Tm, and Yb by a range of 4 to 15 atomic percentages, wherein La is present;
    at least one selected from the group consisting of Fe, Co, Ni, Mn, and Cr by a range of 60 to 93 atomic percentages, wherein Fe is present;
    at least one selected from the group consisting of Si, C, Ge, Al, Ga, and In by a range of 2.9 to 23.5 atomic percentages, wherein Si is present; and
    at least one selected from the group consisting of Ta, Nb, and W by a range of 0.1 to 1.5 atomic percentages,
    wherein said magnetic refrigeration material includes a $NaZn_{13}$ type crystal structure as a main phase and a generation ratio of the $NaZn_{13}$ type crystal structure is equal to or more than 70%.

2. The material of claim 1, wherein the content of said at least one selected from the group consisting of Ta, Nb, and W is set within a range of 0.1 to 1.0 atomic percentage and the generation ratio of the $NaZn_{13}$ type crystal structure is equal to or more than 80%.

3. The material of claim 1, wherein the content of said at least one selected from the group consisting of Y, La, Ce, Pr, Nd, Sm, Eu, Gd, Tb, Dy, Ho, Er, Tm, and Yb except elemental La is set within a range of one atomic percentage or less.

4. The material of claim 1, comprising elemental Fe by a range of 80 to 90 atomic percentages from among said at least one selected from the group consisting of Fe, Co, Ni, Mn, and Cr.

5. The material of claim 1, comprising elemental Co by a range of 0.5 to 15 atomic percentages from among said at least one selected from the group consisting of Fe, Co, Ni, Mn, and Cr.

6. The material of claim 5, wherein the content of said at least one selected from the group consisting of Fe, Co, Ni, Mn, and Cr is set within a range of 10 atomic percentages or less except elemental Fe.

7. The material of claim 1, wherein the content of said at least one selected from the group consisting of Si, C, Ge, Al, Ga, and In except elemental Si is set within a range of two atomic percentages or less.

8. The material of claim 1, comprising:
elemental La within a range of 5 to 10 atomic percentages;
elemental Fe within a range of 70 to 91 atomic percentages; and
elemental Si within a range of 4 to 20 atomic percentages.

9. The material of claim 1, wherein said material is granulated in spherical shape or oval shape so that an aspect ratio of said material is set within a range of two or less.

10. The material of claim 9, wherein a size of the thus granulated material is set within a range of 0.1 to 2 mm.

11. The material of claim 9, comprising:
a coating layer having a thickness of 10 μm or less on the thus obtained granulated material.

12. A magnetic refrigeration device, comprising:
a heat exchanger filled with a magnetic refrigeration material of claim 1; and
a magnetic generator configured to apply a magnetic field to said magnetic refrigeration material filled in said heat exchanger and remove said magnetic field from said magnetic refrigeration material.

13. The device of claim 12, wherein a volume charging ratio of said magnetic refrigeration material is set within a range of 40 to 80% for a volume of said heat exchanger.

14. A magnetic refrigeration material, comprising:
at least one selected from the group consisting of Y, La, Ce, Pr, Nd, Sm, Eu, Gd, Tb, Dy, Ho, Er, Tm, and Yb by a range of 4 to 15 atomic percentages, wherein La is present;
at least one selected from the group consisting of Fe, Co, Ni, Mn and Cr by a range of 60 to 93 atomic percentages, wherein Fe is present;
at least one selected from the group consisting of Si, C, Ge, Al, Ga, and In by a range of 2.9 to 23.5 atomic percentages, wherein Si is present; and
at least one selected from the group consisting of Ta, Nb, and W by a range of 0.1 to 1.0 atomic percentage,
wherein said magnetic refrigeration material includes a $NaZn_{13}$ type crystal structure as a main phase and a generation ratio of the $NaZn_{13}$ type crystal structure is equal to or more than 80%.

15. The material of claim 14, wherein the content of said at least one selected from the group consisting of Y, La, Ce, Pr, Nd, Sm, Eu, Gd, Tb, Dy, Ho, Er, Tm, and Yb except elemental La is set within a range of one atomic percentage or less.

16. The material of claim 14, comprising elemental Fe by a range of 80 to 90 atomic percentages from among said at least one selected from the group consisting of Fe, Co, Ni, Mn, and Cr.

17. The material of claim 14, comprising elemental Co by a range of 0.5 to 15 atomic percentages from among said at least one selected from the group consisting of Fe, Co, Ni, Mn, and Cr.

18. The material of claim 14, comprising:
elemental La within a range of 5 to 10 atomic percentages;
elemental Fe within a range of 70 to 91 atomic percentages; and
elemental Si within a range of 4 to 20 atomic percentages.

19. The material of claim 14, wherein said material is granulated in spherical shape or oval shape so that an aspect ratio of said material is set within a range of two or less.

20. The material of claim 19, comprising:
a coating layer having a thickness of 10 μm or less on the thus obtained granulated material.

* * * * *